United States Patent [19]

Simard

[11] Patent Number: 5,234,067
[45] Date of Patent: Aug. 10, 1993

[54] TANDEM AXLE SUSPENSION FOR VEHICLE

[75] Inventor: André Simard, Baie St. Paul, Canada

[73] Assignee: Emmanuel Simard et fils (1983) Inc., Baie St. Paul, Canada

[21] Appl. No.: 895,754

[22] Filed: Jun. 9, 1992

[51] Int. Cl.⁵ .................................................. B60G 5/01
[52] U.S. Cl. ............................... 180/24.01; 180/140; 280/682
[58] Field of Search ....................... 280/91, 682, 676; 180/140, 24.01

[56] References Cited

U.S. PATENT DOCUMENTS

| | | | |
|---|---|---|---|
| 1,694,422 | 12/1928 | Leytens | 280/682 |
| 1,745,433 | 2/1930 | Marcum | 280/682 |
| 1,851,198 | 3/1932 | Marcum | 280/91 |
| 1,871,432 | 8/1932 | Fageol | 280/91 |
| 2,451,293 | 10/1948 | Long | 280/682 |
| 3,199,892 | 8/1965 | Boys | 280/682 |
| 3,378,277 | 4/1968 | Gadd | |
| 4,033,606 | 7/1977 | Ward et al. | |
| 4,591,177 | 5/1986 | Perlini | 280/91 |
| 4,813,695 | 3/1989 | Reid | |
| 4,907,814 | 3/1990 | Foster | |

FOREIGN PATENT DOCUMENTS

| | | |
|---|---|---|
| 279674 | 4/1928 | Canada . |
| 527073 | 7/1956 | Canada . |
| 705029 | 3/1965 | Canada . |
| 1229860 | 1/1987 | Canada . |
| 445336 | 8/1948 | Italy ................ 280/682 |
| 540761 | 3/1956 | Italy ................ 280/682 |

Primary Examiner—Karin L. Tyson
Attorney, Agent, or Firm—Edwin E. Greigg; Ronald E. Greigg

[57] ABSTRACT

A tandem axle suspension for use in a vehicle such as a truck or semi-trailer, which is particularly efficient and stable and well adapted for use when the axles support steering wheels, has, on each side, front and rear leaf-spring assemblies that are aligned with respect to each other and positioned forwardly and rearwardly of an equalizer beam. The front leaf-spring assembly has a front end pivotably connected by a pin to the vehicle frame and a rear end connected by a shackle to the front end of the equalizer beam. The rear leaf-spring assembly has a front end pivotably connected by a pin to the rear end of the equalizer beam and a rear end connected by a shackle to the frame of the vehicle.

6 Claims, 3 Drawing Sheets

TANDEM AXLE SUSPENSION FOR VEHICLE

BACKGROUND OF THE INVENTION a) Field of the Invention

The present invention is broadly concerned with a tandem axle suspension for use in a vehicle such as a truck or semi-trailer, having a frame beneath which two axles are mounted in tandem relationship through a set of leaf spring assemblies interconnected by equalizer beams.

The invention is however more particularly yet not restrictively concerned with a tandem axle suspension for use in a vehicle of the above mentioned type, in which the two axles mounted in tandem relationship, support steering wheels and thus are part of the steering system of this vehicle.

b) Brief Description of the Prior Art

Tandem axle suspensions of the above mentioned type in which two axles in tandem relationship are attached to four semi-elliptic leaf-spring assemblies symmetrically attached on both sides of the vehicle and interconnected by means of equalizer beams, are well known in the art and form the subject matter of numerous patents. By way of non-restrictive examples of such patents, reference can be made to the following Canadian and U.S. Pat. Nos.:

| Canadian patent Nos.: | | |
|---|---|---|
| 279,674 | (WARHUS) | 1928 |
| 527,073 | (BOYLES) | 1958 |
| 705,029 | (BOYS) | 1965 |
| 1,229,860 | (JABLE et al) | 1987 |
| U.S. Pat. Nos.: | | |
| 3,378,277 | (GADD) | 1968 |
| 4,033,606 | (WARD et al) | 1977 |
| 4,813,695 | (REID) | 1989 |
| 4,907,814 | (FORSTER) | 1990 |

Basically all these known suspensions comprise the same three major structural elements on each side of the vehicle, namely:

1) a first leaf-spring assembly beneath which the front axle of the tandem is rigidly attached;
2) an equalizer beam rockably mounted about a transversal pivot onto an equalizer support bracket rigidly attached to the frame of the vehicle at a short distance behind the first leaf-spring assembly, this beam being aligned with the first leaf-spring assembly and having a front end extending forwardly with respect to its pivot and and a rear end extending rearwardly with respect to this pivot;
3) a second leaf-spring assembly aligned with the first leaf-spring assembly and extending behind the equalizer beam, beneath which the rear axle of the tandem is rigidly attached.

So far, the known suspensions essentially rom each other in the way the three above mentioned elements are connected to each other and/or to the frame of the vehicle.

In one conventional embodiment, the front and rear ends of the equalizer beam are pivotaby connected by means of shackles to the rear and front ends of the first and second leaf-spring assemblies, respectively, while the front and rear ends of these assemblies are connected to the frame of the vehicle in such a manner as to be free to move or "slide" longitudinally with respect to it (see U.S. Pat. No. 4,033,606 and Canadian patent No. 1,299,860).

In another conventional embodiment, the rear and front ends of the first and second leaf-spring assemblies are also connected to the ends of the equalizer beam by means of shackles, but the front and rear ends of these assemblies are connected to the frame of the vehicle in such a manner as to be free to pivot but not to slide (see Canadian patent Nos. 279,674; 527,073 and 705,029).

In a further conventional embodiment, the rear and front ends first and second leaf-spring assemblies are pivotably yet not slidably connected to the ends of the equalizer beam while the front and rear ends of these assemblies are connected to the frame of the vehicle in such a manner to be free to slide (see U.S. Pat. Nos. 3,378,277 and 4,907,814) or free to pivot but not to slide (see U.S. Pat. No. 4,813,695).

All of these known suspensions have proved to be generally efficient. However, they all suffer from the same drawbacks which are:

either to unduly reduce the freedom of the leaf-spring assemblies and thus the efficiency of the same when the ends of these assemblies are connected directly to the frame and equalizer bar, and no sliding is allowed, or to give too much freedom to the leaf-spring assemblies and thus generate instability problems that can only be solved by the use of stabilization rods also known as "torque rods".

Moreover, on most of the known suspensions where both axles of the tandem are free to slide, another major drawback is encountered. Indeed, due to the way the spring-leaf assemblies are connected, both axles are usually not allowed to move in unison in the same direction when a force is exerted on one or both of them. As a matter of fact, they rather move in opposite directions, thereby applying substantial stress onto rods or bars that may be connected thereto, such as the steering bars of a steering system when the tandem axle is part of such a steering system.

To overcome the latter drawback, it has been suggested to "combine" the three basic structural elements mentioned hereinabove in a completely different manner by connecting the front and rear ends of the equalizer beam to the rear ends of the first and second spring-leaf assemblies, respectively. See, by way of examples, Canadian Pat. No. 250,418 (MARCUM) of 1925 and U.S. Pat. Nos. 2,226,100 (LARSON) of 1939; 3,580,347 (McGEE) of 1971 and 3,933,367 (TAMAS) of 1976. However, such a solution makes the suspension more complicated, and not useful as part of a steering system because of a lack of space on both sides of the vehicle frame.

OBJECTS AND SUMMARY OF THE INVENTION

A first object of the present invention is to provide a tandem axle suspension of the above mentioned type, which does not have any of the above mentioned drawbacks.

More particularly, the first object of the invention is to provide a suspension wherein, in use, any force exerted on one of the front and rear axles and causing displacement of this axle as a result of a deflection of the corresponding leaf-spring assembly, is transmitted through the equalizer beam to the other axle, and causes simultaneous displacement in substantially the same direction of this other axle. This very precise transfer of weight from one axle to the other advantageously allows the suspension to be used when the tandem axles are part of a steering system.

Another object of the invention is to provide a suspension of the above mentioned type, which, thanks to its structure that makes the axles free to follow the rocking motion of the equalizer beam, is capable of better absorbing the shocks and thus providing greater comfort.

A further object of the invention is to provide a suspension of the above mentioned type, which is long lasting, very reliable in use, easily adaptable to any kind of vehicle, and not subject to frequent maintenance and which, due to its efficiency, substantially improves the life-time of the tires and the wheel mounting and/or steering components.

In accordance with the invention, the above objects are achieved with a suspension for use in a vehicle having a frame beneath which a front axle and a rear axle are mounted in tandem relationship, the suspension comprising, on each side of the vehicle:

a first leaf-spring assembly having a front end and a read end;

means for pivotably attaching the front end of the first leaf-spring assembly to the frame of the vehicle;

means for rigidly attaching the front axle centrally beneath the first leaf-spring assembly;

an equalizer support bracket rigidly attached to the frame of the vehicle at a short distance behind the rear end of the first leaf-spring;

an equalizer beam rockably mounted onto the equalizer support bracket about a transversal pivot, the equalizer beam being aligned with the first leaf-spring assembly and having a front end extending forwardly with respect to the pivot and a rear end extending rearwardly with respect to this pivot;

a first shackle pivotably attached to the rear end of the first leaf-spring assembly and to the front end of the equalizer beam for operatively interconnecting the same;

a second leaf-spring assembly also having a front end and a rear end, the second leaf-spring assembly being aligned with the first leaf-spring assembly and extending behind the equalizer beam;

means for pivotably attaching the front end of the second leaf-spring assembly to the rear end of the equalizer beam;

means for rigidly attaching the rear axle centrally beneath the second leaf-spring assembly; and a second shackle pivotably attached to the rear end of the second leaf-spring and to the frame of the vehicle, for operatively interconnecting the same.

Thanks to this particular arrangement, any force exerted on one of the front and rear axles and causing displacement of this one axle as a result of a deflection of the corresponding leaf-spring assembly, is transmitted through the equalizer beam to the other axle, and causes simultaneous displacement of this other axle in substantially the same direction.

The equalizer beam is preferably mounted onto the equalizer support bracket in such a manner as to extend forwardly downwardly at a slight angle in normal use. Moreover, the front and rear axles are preferably mounted beneath the first and second leaf-spring assemblies in such a manner as to extend closer to the front ends of these assemblies than to the rear ends thereof, respectively, while the equalizer beam is simultaneously selected so that its rear end is closer to its transversal pivot than is its front end.

This preferred arrangement is particularly efficient in that it takes advantage of the asymmetry of the leaf-spring assemblies relative to their respective axles to achieve optimum transfer of weight.

The basic structure and advantages of the suspension according to the invention will be better understood upon reading the following non-restrictive description of a preferred embodiment thereof given with reference to the accompanying drawings.

DESCRIPTION OF A PREFERRED EMBODIMENT

Figure 1:
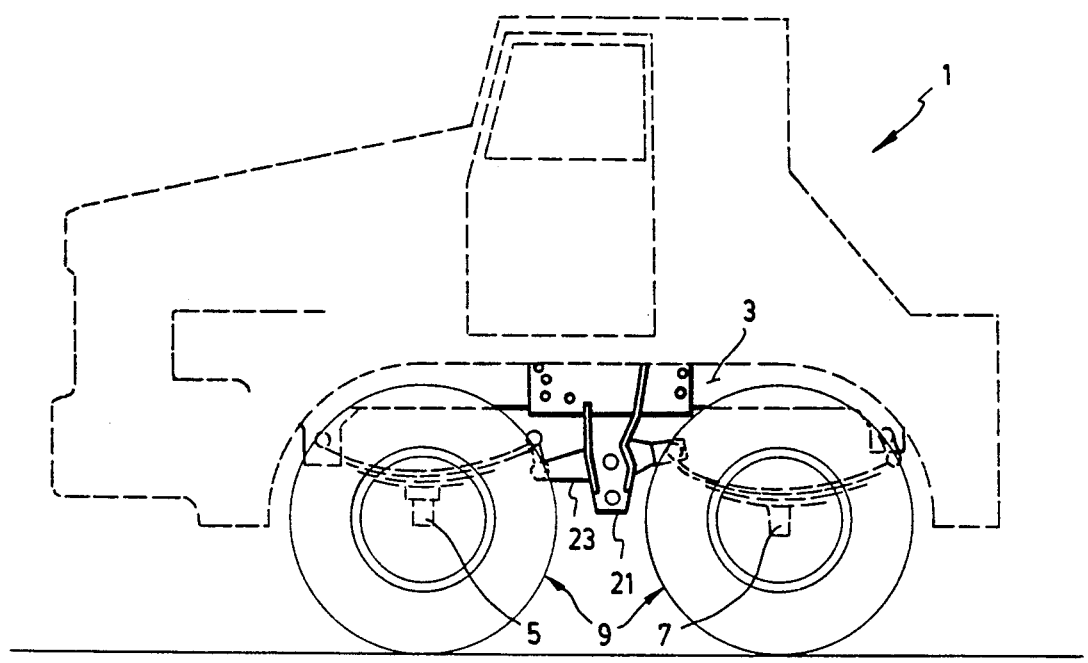
FIG. 1 is a side elevational view of the front of a vehicle provided with two axles which are mounted in tandem relationship beneath the vehicle frame with a suspension according to the invention, and which both support steering wheels.

The suspension according to the invention as it is shown in FIG. 1 of the accompanying drawings, is intended to be used in a vehicle 1 having a frame 3 beneath which a front axle 5 and a rear axle 7 are mounted in tandem relationship. In the illustrated embodiment, these front and rear axles 5, 7 are mounted at the front of the vehicle and each support a par of steerable wheels 9.

Figure 4:
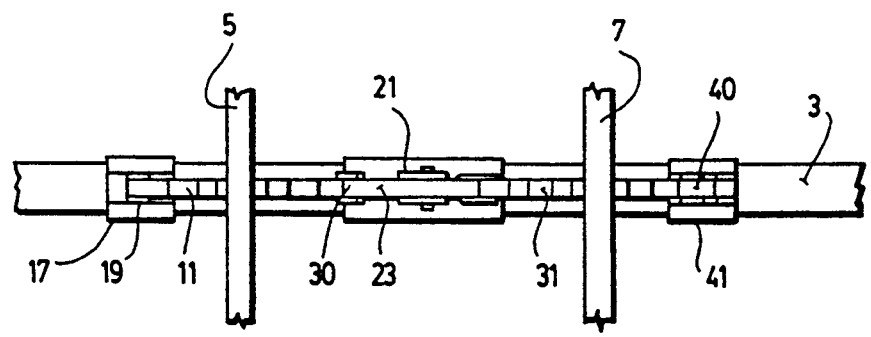
FIG. 4 which appears on the same sheet of drawings as FIG. 1, is a bottom plan view of the suspension of the vehicle shown in FIG. 1, on one side thereof.
Figure 2:
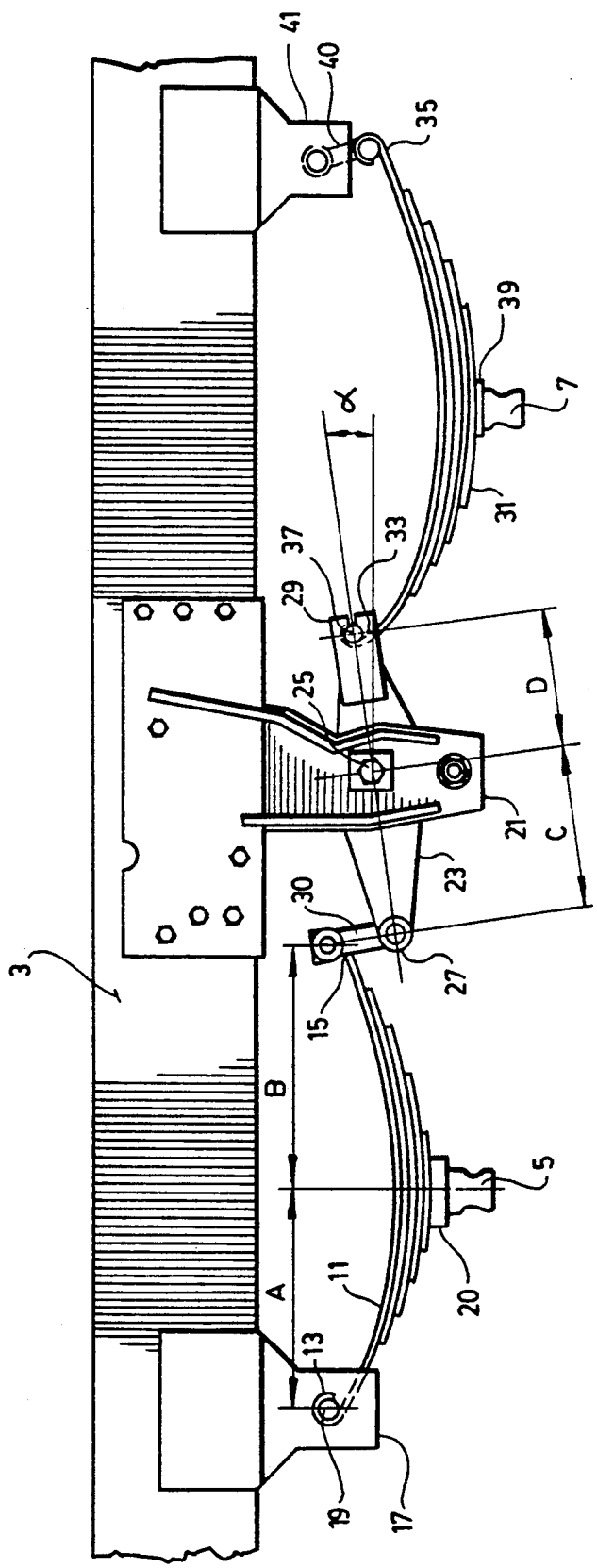
FIG. 2 is a side elevational view of the suspension shown in FIG. 1.

Referring now to FIGS. 2 and 4, the suspension according to the invention comprises, on each side of the vehicle, a first leaf-spring assembly 11 having a front end 13 and a rear end 15 both shaped to form end-receiving eyes. The front end 13 of the first leaf-spring assembly 11 is pivotably attached to the frame 3 of the vehicle by means known per se comprising a first leaf-spring support bracket 17 rigidly attached to the frame, and a first transversal pin 19 extending through the eye provided at the front end 13 of the first leaf-spring assembly.

Of course, means also known per se including an axle seat 20 held by U-bolts and nuts (not shown), are provided for rigidly attaching the front axle 5 centrally beneath the first leaf-spring assembly 11.

The suspension according to the invention also comprises, on each side of the vehicle, an equalizer support bracket 21 rigidly attached to the frame 3 at a short distance behind the rear end 15 of the first leaf-spring assembly 11, and an equalizer beam 23 rockably mounted onto the equalizer support bracket 21 about a transversal pivot 25. This equalizer beam 23 is aligned with the first leaf-spring assembly 11 and has a front end 27 that extends forwards with respect to the pivot 25, and a rear end 29 that extends rearwards with respect to the same pivot 25.

A first shackle 30 is pivotably attached with pins to the rear end 15 of the first leaf-spring assembly 11 and to the front end 27 of the equalizer beam 23 for operatively interconnecting the sames.

The suspension according to the invention further comprises, on each side of the vehicle, a second leaf-spring assembly 31 also having a front end 33 and a rear end 35 both shaped to form pin-receiving eyes. This second assembly 31 is aligned with the first leaf-spring assembly 11 and extends behind the equalizer beam 21.

Means are provided for pivotably attaching the front end 33 of the second leaf-spring assembly 31 to the rear end 29 of the equalizer beam 21. These means preferably comprise a second transversal pin 37 extending through the eye provided at the front end 33 of the second leaf-spring assembly 31.

Once again, means known per se and including an axle seat 40, are provided for rigidly attaching the rear axle 7 centrally beneath the second leaf-spring assembly 31.

A second shackle 40 is pivotably attached with opens to the rear end 35 of the second leaf-spring assembly 31, and to a second leaf-spring support bracket 41 rigidly attached to the frame 3 of the vehicle, for operatively interconnecting the sames.

The way all these structural components may be shaped and connected is well known in this field and needs not be further described.

As may now be better appreciated, any force exerted in use on one of the front and rear axles, say, for example, axle 5, will cause an upwards and rearwards displacement of this axle as a result of the deflection of the corresponding leaf-spring assembly 11. Such displacement will in turn be transmitted through the equalizer beam 23 to the other axle 7, which thanks to the second leaf-spring assembly 31 which is mounted in the very same way as the first assembly 11, will allow the second axle 7 to be displaced in substantially the same direction as the axle 5.

Such a particular behavior is of the uppermost importance, since it makes the suspension according to the invention very efficient and stable although it does not comprises any stabilization rods. Moreover, this particular behaviour which allows the axles of the tandem to move "in unison", makes the suspension usable when the axles support steering wheels as is shown in FIG. 1. Indeed, in such a case, a minimum of stress is applied to the steering bars and other components of the steering system.

Figure 3:
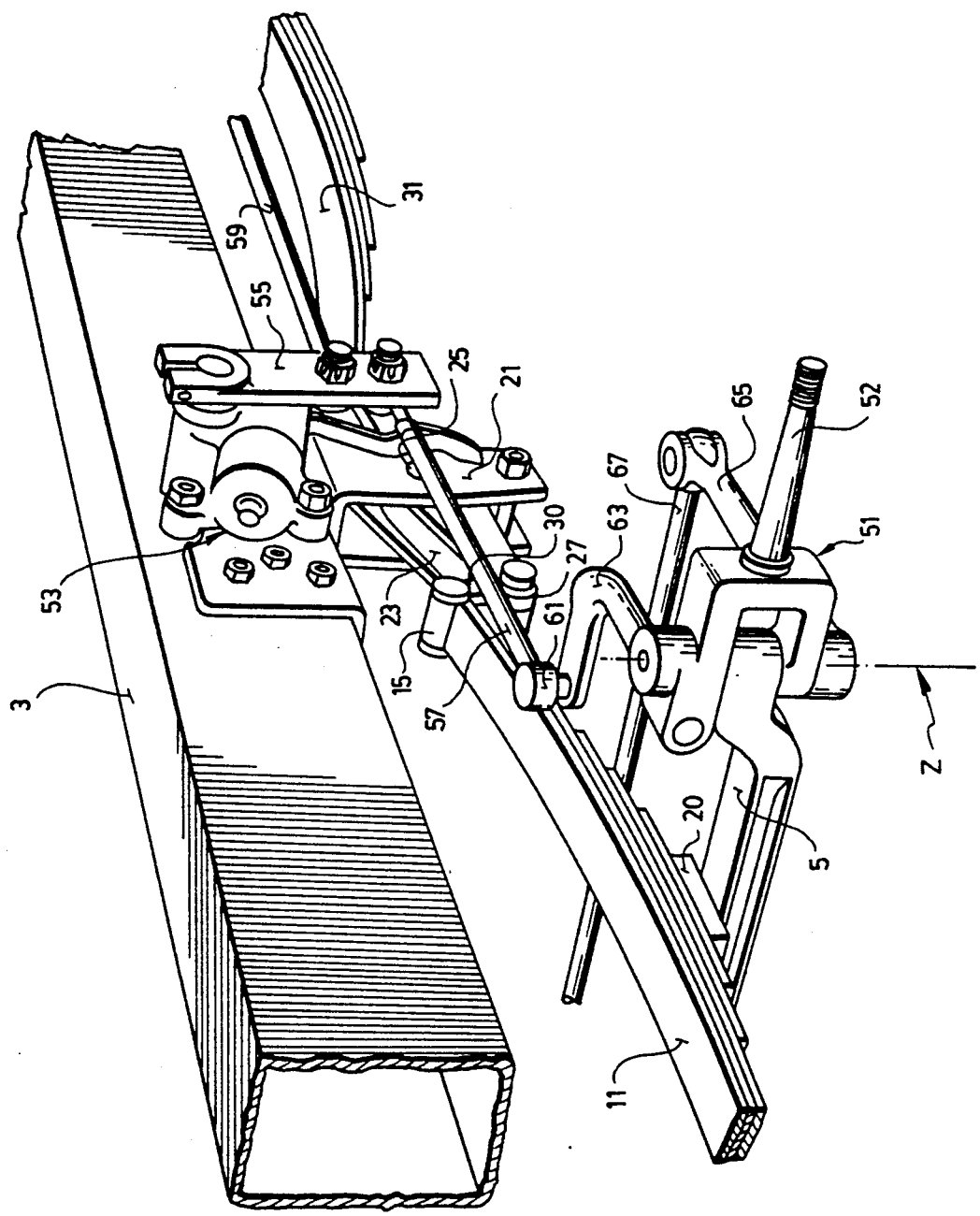
FIG. 3 is a partial perspective view of the suspension of the vehicle shown in FIG. 1, showing also part of the steering system of this vehicle.

As is better shown in FIG. 3, the suspension according to the invention may thus be part of the steering As is known in this field, the steering system may comprise a steering knuckle assembly 51 mounted at each end of each axle 5, 7, for allowing a wheel 9 attached to a shaft 52 forming part thereof to pivot about a vertical axis "Z". The steering system may also comprise, on each side of the frame of the vehicle:

a power steering assembly 53 mounted on the frame 3 of the vehicle between the front and rear axles 5, 7;
a steering lever 55 operatively connected to and actuated by the power steering assembly 53;
a pair of steering bars 57, 59 having first ends pivotably connected to the steering lever 55 and second opposite ends pivotably connected by ball socket connectors 61 to steering arms 63 forming part of the steering knuckle assemblies 51 mounted at the corresponding ends of the front and rear axles to steer the corresponding wheels in unison; and
means for operatively interconnecting the wheels 9 mounted on the shafts 52 at the ends of each of the axles 5, 7, these means including steering knuckle arms 65 forming part of the steering knuckle assemblies 51 mounted at the opposite ends of each axle, and a tie rod 67 extending transversely to the frame and having ends pivotably connected to the knuckle arms 65.

As it may again be appreciated, the suspension according to the invention, due to its behaviour in use, prevents the steering bars 57, 59 from being overstressed and thus the steering system from being either non-operative, or difficult to operate in addition to being in need of frequent maintenance.

It is of common practice to mix the front and rear axles of a tantem suspension beneath the first and second leaf-spring assemblies of this suspension on such a manner that they extend closer t o the front ends of these assemblies than to the rear ends thereof, respectively. Tests conducted by the inventor have shown that, in such a case, maximum efficiency is achieved, if the rear end 29 of the equalizer beam 23 is closer to the transversal pivot 25 mounting the beam to the equalizer support bracket 21 than is the front end 23 of the same beam. These tests have also shown that the equalizer beam 21 should be mounted onto the equalizer support bracket 21 in such a manner as to extend forwardly downwardly at a slight angle ranging between 10° and 20° in normal use.

Thus, by way of example, if use is made of spring-leaf assemblies like those sold by FORD under the trade designation P/N 43 434 and the distances A and B between each axle and the ends of the corresponding leaf-spring assembly are respectively equal to 23 13/16" and 28 5/16" (see FIG. 2), then the distances C, D between the pivot 25 and the front and rear ends 25, 27 of the equalizer beam 23 should preferably be equal to 11 ¼" and 9 3/4", respectively, to achieve maximum efficiency.

Of course, if use is made of spring-leaf assemblies of other companies, the distances A, B, C and D will vary. However, slight differences of the same magnitude as above between these distances should remain.

It may be appreciated that numerous modifications could he made to the above described embodiment what is only a preferred one, without departing from the scope of the invention as defined in the appended claims.

What is claimed is:

1. A tandem axle suspension for use in a vehicle having a frame beneath which a front axle and a rear axle are mounted in tandem relationship, said suspension comprising, on each side of the vehicle;

a first leaf-spring assembly having a front end and a rear end;
means for pivotably attaching the first end of the first leaf-spring assembly to the frame of the vehicle;
means for rigidly attaching the front axle centrally beneath the first leaf-spring assembly;
an equalizer support bracket rigidly attached to the frame of the vehicle at a short distance behind the rear end of the first leaf spring;
an equalizer beam rockably mounted onto said equalizer support bracket about a transversal pivot, said equalizer beam being aligned with said first leaf-spring assembly and having a front end extending forwardly with respect to the pivot and a rear end extending rearwardly with respect to said pivot;
a first shackle pivotably attached to the rear end of the first leaf-spring assembly and to the front end of the equalizer beam for operatively interconnecting the same;

a second leaf-spring assembly also having a front end and a rear end, said second leaf-spring assembly being aligned with the first leaf-spring assembly and extending behind the equalizer beam;

means for pivotably attaching the front end of the second leaf-spring assembly to the rear end of the equalizer beam;

means for rigidly attaching the rear axle centrally beneath the second leaf-spring assembly;

a second shackle pivotably attached to the rear end of the second leaf-spring assembly and to the frame of the vehicle, for operatively interconnecting the same, and said front and rear axles centrally mounted beneath said first and second leaf-spring assemblies, extending closer to the front ends of said assemblies than to the rear ends thereof, respectively; the rear end of the equalizer beam being closer to the transversal pivot mounting said beam to the equalizer support bracket than is the front end of said beam, whereby, in use, any force exerted on one of said front and rear axles and causing displacement of said one axle as a result of a deflection of the corresponding leaf-spring assembly, is transmitted through the equalizer beam to the other one of said front and rear axles, and causes simultaneous displacement in substantially the same direction as the other one of said axles.

2. The suspension of claim 1, wherein the equalizer beam is mounted onto the equalizer support bracket in such a manner as to extend forwardly downwardly at a slight angle in normal use.

3. The suspension of claim 2, wherein:

said means for pivotably attaching the front end of the first leaf-spring assembly to the frame of the vehicle comprises a first leaf-spring support bracket rigidly attached to the frame, and a first transversal pin extending through a first eye provided at the front end of said first leaf-spring assembly;

said means for pivotably attaching the front end of the second leaf-spring assembly to the rear end of the equalizer beam comprises a second transversal pin extending through a second eye provided at the front end of the second leaf-spring assembly; and said second shackle is pivotably attached to the frame of the vehicle through a second leaf-spring support bracket rigidly attached to said frame.

4. The suspension of claim 1, wherein said front and rear axles are part of a steering system including:

a steering knuckle assembly mounted at each end of each axle for allowing a wheel attached thereto to pivot about a vertical axis; and on each side of the frame of the vehicle:

a power steering assembly mounted on the frame of the vehicle between the front and rear axles;

a steering lever operatively connected to and actuated by the power steering assembly;

a pair of steering bars having first pivotably connected to the steering lever and second opposite ends pivotably connected by ball socket connectors to steering arms forming part of the steering knuckle assemblies mounted at the corresponding ends of the front and rear axles to steer the corresponding wheels in unison; and means for operatively interconnecting the wheels mounted at the ends of each of said axles, said interconnecting means including steering knuckle arms forming part of the steering knuckle assemblies mounted at the opposite ends of each axle and a tie rod extending transversely to the frame, said tie-rod having ends pivotably connected to said knuckle arm.

5. The suspension of claim 2, wherein said front and rear axles are part of a steering system including:

a steering knuckle assembly mounted at each end of each axle for allowing a wheel attached thereto to pivot about a vertical axis; and on each side of the frame of the vehicle;

a power steering assembly mounted on the frame of the vehicle between the front and rear axles;

a steering lever operatively connected to and actuated by the power steering assembly;

a pair of steering bars having first pivotably connected to the steering lever and second opposite ends pivotably connected by ball socket connectors to steering arms forming part of the steering knuckle assemblies mounted at the corresponding ends of the front and rear axes to steer the corresponding wheels in unison; and means for operatively interconnecting the wheels mounted at the ends of each of said axles, said interconnecting means including steering knuckle arms forming part of the steering knuckle assemblies mounted at the opposite ends of each axle and a tie rod extending transversely to the frame, said tie-rod having ends pivotably connected to said knuckle arm.

6. The suspension of claim 3, wherein said front rear axles are part of a steering system including:

a steering knuckle assembly mounted at each end of each axle for allowing a wheel attached thereto to pivot about a vertical axis; and on each side of the frame of the vehicle;

a power steering assembly mounted on the frame of the vehicle between the front and rear axles;

a steering lever operatively connected to and actuated by the power steering assembly;

a pair of steering bars having first pivotably connected to the steering lever and second opposite ends pivotably connected by ball socket connectors to steering arms forming part of the steering knuckle assemblies mounted at the corresponding ends of the front and rear axles to steer the corresponding wheels in unison; and means for operatively interconnecting the wheels mounted at the ends of each of said axles, said interconnecting means including steering knuckle arms forming part of the steering knuckle assemblies mounted at the opposite ends of each axle and a tie rod extending transversely to the frame, said tie-rod having ends pivotably connected to said knuckle arm.

* * * * *